US006160582A

United States Patent [19]

Hill

[11] Patent Number: 6,160,582

[45] Date of Patent: Dec. 12, 2000

[54] APPARATUS FOR MANIPULATING AN OPERATING THEATER LAMP

[75] Inventor: Wolfram Hill, Freiburg, Germany

[73] Assignee: Gebrueder Berchtold GmbH & Co., Tuttlingen, Germany

[21] Appl. No.: 09/237,505

[22] Filed: Jan. 26, 1999

[30] Foreign Application Priority Data

Jan. 29, 1998 [DE] Germany ........................... 198 03 494

[51] Int. Cl.[7] ........................... H04N 5/222

[52] U.S. Cl. ........................... 348/370; 362/804

[58] Field of Search ........................... 315/291, 312, 315/317, 318, 316, 292; 348/68, 69, 211, 370, 373; 362/804, 285; 600/122, 149

[56] References Cited

U.S. PATENT DOCUMENTS

| | | | |
|---|---|---|---|
| 2,911,519 | 11/1959 | Phillips . | |
| 4,866,526 | 9/1989 | Ams et al. | 348/69 |
| 4,872,029 | 10/1989 | Kato | 348/69 |
| 4,969,034 | 11/1990 | Salvati | 348/69 |
| 5,093,769 | 3/1992 | Luntsford . | |
| 5,347,431 | 9/1994 | Blackwell . | |
| 5,623,382 | 4/1997 | Rosenberg . | |
| 5,668,537 | 9/1997 | Chansky et al. | 340/825.06 |
| 5,808,680 | 9/1998 | Steckhan | 348/370 |

FOREIGN PATENT DOCUMENTS

| | | |
|---|---|---|
| 1797040 | 9/1972 | Germany . |
| 2927812 | 1/1980 | Germany . |
| 3227494A1 | 2/1984 | Germany . |
| 8814303 U | 2/1989 | Germany . |
| 3829808A1 | 4/1989 | Germany . |
| 4003778A1 | 3/1991 | Germany . |
| 8913757 U | 5/1991 | Germany . |
| 3243710C2 | 12/1991 | Germany . |
| 9204118 U | 7/1992 | Germany . |
| 9116449 U | 3/1993 | Germany . |
| 9217573 U | 8/1993 | Germany . |
| 4103913C2 | 4/1994 | Germany . |
| 442520C1 | 1/1996 | Germany . |
| 19523377C1 | 8/1996 | Germany . |
| 19512689A1 | 10/1996 | Germany . |
| 19521717A1 | 12/1996 | Germany . |
| 29621838 U1 | 3/1997 | Germany . |
| 29618770 U1 | 4/1997 | Germany . |
| 29621838 U1 | 4/1997 | Germany . |
| 19653507A1 | 6/1998 | Germany . |

OTHER PUBLICATIONS

Kriesel, Werner, Madelung, Otto W. (Publ.) : ASI Das Aktuator–Sensor Interface für die Automation Hanser–Verlag, 1994, pp. 11–83.

*Primary Examiner*—David Vu
*Assistant Examiner*—Ephrem Alemu
*Attorney, Agent, or Firm*—Townsend and Townsend and Crew LLP

[57] ABSTRACT

In a method for the manipulation of an operating theater lamp, control signals are conducted via a signal path which is conducted in the interior of the lamp between an operating unit and at least one setting element. The control signals are modulated via a modulator onto a carrier signal and demodulated back from the latter via a demodulator.

14 Claims, 3 Drawing Sheets

APPARATUS FOR MANIPULATING AN OPERATING THEATER LAMP

BACKGROUND OF THE INVENTION

The present invention relates to a method of manipulating an operating theater lamp and to an apparatus for carrying out this method.

In addition to the mandatory on/off function, modern operating theater lamps, which normally have a lamp body as well as arms arid joints as suspension, also have further functions, such as for example the variation of the strength of the illumination, a motorized light field size adjustment or a movement of the lamp body. The operating of the lamp functions normally takes place via an operating panel which is built into the lamp itself or is secured at one of the suspensions of the lamp. The transmission of a plurality of control signals for the manipulation of an operating theater lamp which is provided with one or more joints which are rotatable by 360°, however, brings about problems, since on the one hand an extremely high cost and complexity of the cabling arises. In addition it is desirable as a result of the pivotability of the operating theater lamps to minimize the lines which are led through the joints inside the operating theater lamp.

The problem (object) lying at the basis of the invention is to provide a method and an apparatus by means of which the transmission of a large number of control signals for the manipulation of an operating theater lamp which is in particular provided with joints is simplified.

SUMMARY OF THE INVENTION

In accordance with the invention the control signals for the manipulation of the operating theater lamp are conducted via a signal path between an operation unit and at least one setting element which is conducted in the interior of the lamp and in particular over joints. In this the control signals are modulated onto a carrier signal via a modulator and demodulated from the carrier signal again via a demodulator. The method in accordance with the invention enables a large number of control signals to be led over a single line which extends inside the operating theater lamp. In a preferred embodiment, in addition to the electrical connection required for the power supply of the illumination means, only one additional signal line need be conducted through the lamp, with only one signal lead being required in this insofar as a further lead, e.g. the protection lead of the lamp, is used for the signal transmission.

In accordance with the invention the carrier signal can also be transmitted over large distances, for example within a building or over remote data lines.

In accordance with a first advantageous embodiment, return message signals from the lamp can also be modulated onto the carrier signal. For example the output signal of an illumination means monitor can be modulated onto the carrier signal.

The control signals can preferably be conducted to a setting element which moves the lamp and/or a lamp arm. Through this it is possible to motorize movements of the lamp or the lamp arm with the lowest cabling cost and complexity so that the lamp can be manipulated in a controlled manner from the operating unit. It can also be advantageous to vary the brightness of the illumination means through the control signals or to change the position of the illumination means in order to vary the size of the light field.

In accordance with a further advantageous embodiment a remote indicator can also be varied through the control signals. A remote indicator of this kind can for example be formed by a laser which is arranged in or at the lamp body and which is moved by a setting element. Alternatively, or additionally, to a remote indicator of this kind a cursor, an indicator or a point which can be varied can be illustrated on a monitor. The variation of the remote indicator which is built into the lamp body preferably takes place synchronously with the variation of the remote indicator on the monitor.

The remote indicator can be varied through a sensor pad, a joystick or a keyboard, with other devices such as track balls, computer mice or the like also being advantageous.

In accordance with a further embodiment of the invention a speech signal is also modulated onto the carrier signal. Through this it is possible to transmit instructions or explanations of the surgeon or to transmit instructions or explanations of this kind into the operation region via the carrier signal.

The transmission of control signals and/or speech signals, preferably takes place bi-directionally, with it being possible for the signals to be digitally coded.

The carrier signal can be conducted on a separate line or the line can be used which serves for the supplying of the operating theater lamp or its illumination means respectively with power.

In accordance with a further embodiment of the invention the carrier signal is conducted on a line which is installed inside a building. In this case the required signals can also be transmitted outside the operation room so that a remote control or remote instruction respectively is possible.

The operating unit is preferably remotely controllable via ISDN so that any desired control and speech signals can be sent to the operating theater lamp via remote data transmission. The operating unit can be formed for example by a PC which is equipped with an ISDN board so that through the connection of the operating theater lamp in accordance with the invention to an ISDN line, any desired participants can receive world-wide the control, image or speech signals which are emitted by the operating theater lamp and under certain conditions can also emit corresponding signals of this kind. Through this it is for example possible to have a specialist who can be located anywhere participate in the operation.

The present invention will be described in a purely exemplary manner in the following with reference to an advantageous embodiment.

DESCRIPTION OF THE PREFERRED EMBODIMENTS

Figure 1:
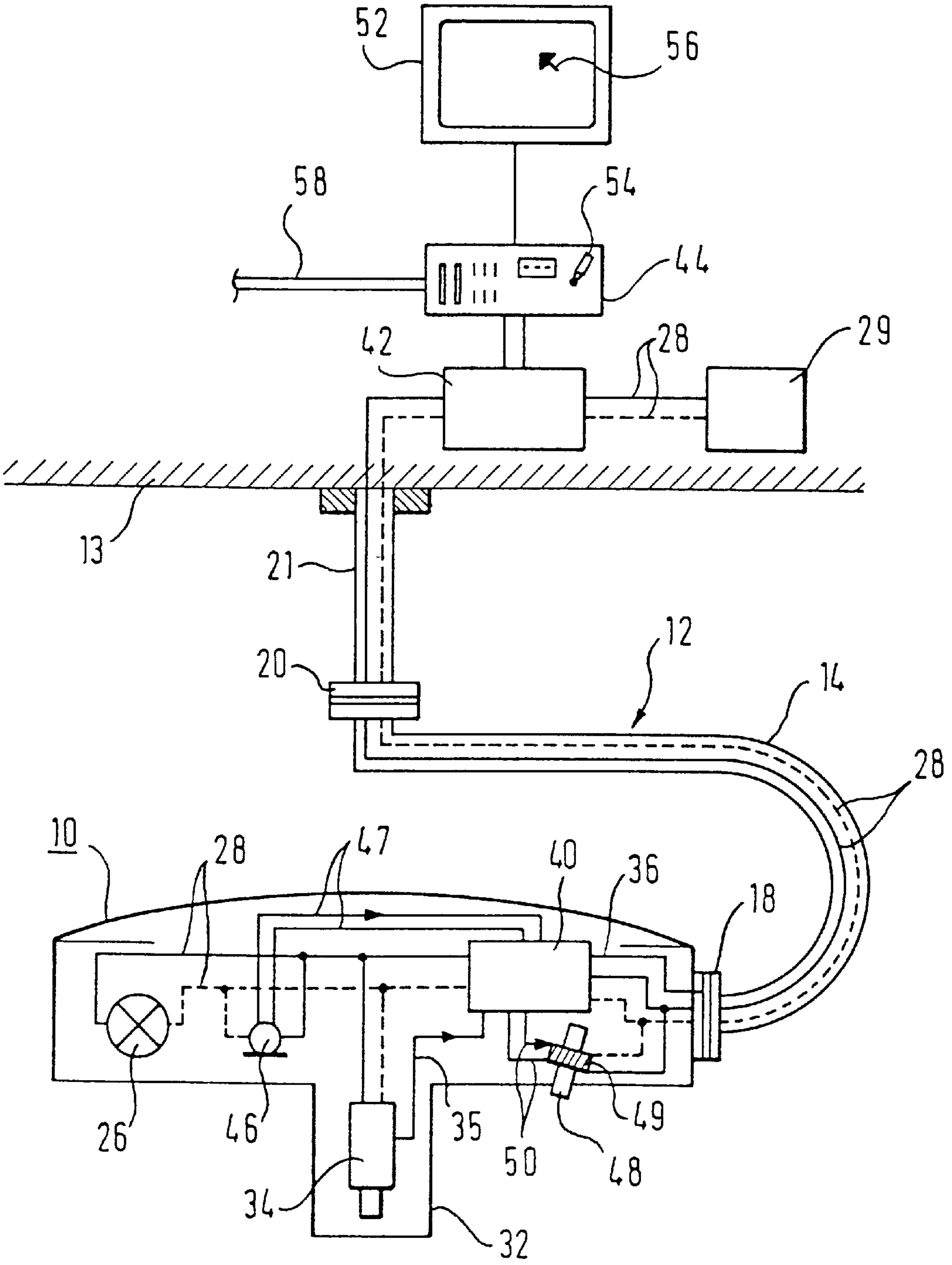
FIG. 1 is a schematic illustration of an operating theater lamp in accordance with the invention.

The operating theater lamp illustrated in FIG. 1 consists of a lamp body 10 and a suspension 12 which is secured at the ceiling 13 of an operation room. The suspension 12 comprises in the illustrated exemplary embodiment a pivot arm 14 which is pivotally connected to the lamp body 10 via a joint 18 and is pivotally connected to a ceiling suspension 21 via a joint 20. Both joints 18 and 20 are designed in such a manner that a 360° rotation without an abutment is possible.

A halogen low-voltage bulb 26 is provided in the lamp body 10 (a reserve bulb which is likewise provided is not illustrated) and is supplied with power via an electrical line 28 which is conducted through the lamp suspension 12. In the illustrated exemplary embodiment the electrical line 28 has two leads.

The line 28 is conducted inside the lamp body 10 through a modulator/demodulator 40 and then passes through the suspension 12. After leaving the suspension 12 the line 28 is again conducted via a further modulator/demodulator 42, which is in connection with an operating unit 44. After leaving the further modulator/demodulator 42 the line 28 is connected up to a power supply 29 which provides the bulb 26 and other devices of the operating theater lamp with power. In the joints 18 and 20 the electrical line 28 is conducted via multiple-pole brush rings, through which a free 360° rotation about the joint axis is possible without abutment.

In a centrally arranged hand grip 32 of the lamp body 10 a miniature camera 34 is furthermore arranged, the power supply of which likewise takes place via the electrical line 28. The image signals of the camera are supplied to the modulator/demodulator 40 via an image signal line 35.

Furthermore, a microphone 46 and a semiconductor laser 48 which serves as a remote controlled pointer are located in the lamp body 10. Both the microphone and the semiconductor laser are connected to the line 28 for the supplying of power, with possible rectifier devices not being illustrated. The speech output of the microphone 46 is likewise connected to the modulator/demodulator 40 via two lines 47. A setting element 49 of the semiconductor laser 48 is in connection with the modulator/demodulator 40 via a control line 50 and enables an adjustment of the laser point along two coordinates which are at right angles to one another.

The further modulator/demodulator 42, which is arranged outside the operating theater lamp, is connected to the operating unit 44, which is in turn in connection with a monitor 52 on which the image signals which are supplied by the miniature camera 34 via the image signal line 35 can be displayed.

An indicator arrow 56 can be varied on the monitor 52 via a joystick 54 which is provided at the operating unit 44. In this the setting element 49 of the semiconductor laser 48 can also be manipulated synchronously with the movement of the indicator arrow 56 so that a synchronous movement of the two remote indicators 48 and 56 results.

Furthermore, an ISDN interface 58 is located at the operating unit 44, via which all image, speech or control signals can be coupled in and out.

During operation the operating theater lamp in accordance with the invention is supplied with power via the power supply 29 and the line 28 so that a current flows through the illumination means 26. Control signals are supplied in this situation to the modulator/demodulator 42 via operating elements at the operating unit 44 and are modulated onto the line 28 and demodulated again by the modulator/demodulator 40 so that the brightness of the illumination means 26 can be varied without steps. Furthermore, a (non-illustrated) drive device is provided in both joints 18 and 20 through which the lamp body 10 can be manipulated, which means pivoted. Here as well the excitation of the drive devices takes place via the operating unit 44, with the corresponding control signals being modulated onto the line 28 in the modulator/demodulator 42 and demodulated again in the modulator/demodulator 40. The required control signals are conducted from the modulator/demodulator 40 via a signal line 36 to the drive device 18 *a* in the joint 18. The drive device 20 *a* which is present in the joint 20 can be excited directly from the operating unit 44 via a non-illustrated signal line.

The miniature camera which is provided in the hand grip 32 of the lamp body 10 transmits its image signals via the image signal line 35 to the modulator/demodulator 40, in which the image signals are modulated onto the line 28. The demodulation takes place in the modulator/demodulator 42, which is in connection with the operating unit 44 and the monitor 52 so that the image signals can be displayed on the monitor 52. Through an actuation of the joystick 54 at the operating unit 44 the indicator 56 can be moved on the monitor 52, with it being possible to switch in a movement of the semiconductor laser 48 synchronously with this movement. For this purpose the control signals which are required for this are given from the operating unit 44 into the modulator/demodulator 42 and modulated there onto the line 28. After the demodulation in the modulator/demodulator 40 the control signals arrive via the line 50 at the setting element 49 of the semiconductor laser 48.

A speech transmission can take place during the operation through the microphone 46, the power supply of which likewise takes place via the line 28. The speech signals of the microphone 46 are given via the line 47 to the modulator/demodulator 40, with the demodulation again taking place in the modulator/demodulator 42.

All speech, image and control signals can be given onto the ISDN line 58 in the operating unit 44 so that the operating theater lamp can also be remotely controlled from the outside and over large distances. The line 28 can also travel over long paths after leaving the operating theater lamp, for example within a hospital, with it being possible to transmit all signals via this single line.

A PC which is provided with the corresponding switching stages can be used as an operating unit 44 or as a substitute for this operating unit in order to carry out the desired functions.

It is also possible to transmit the control signals for the miniature camera through modulation and demodulation via the line 28, which need not necessarily be used for a supplying of the illumination means 26 with power.

Figure 2:
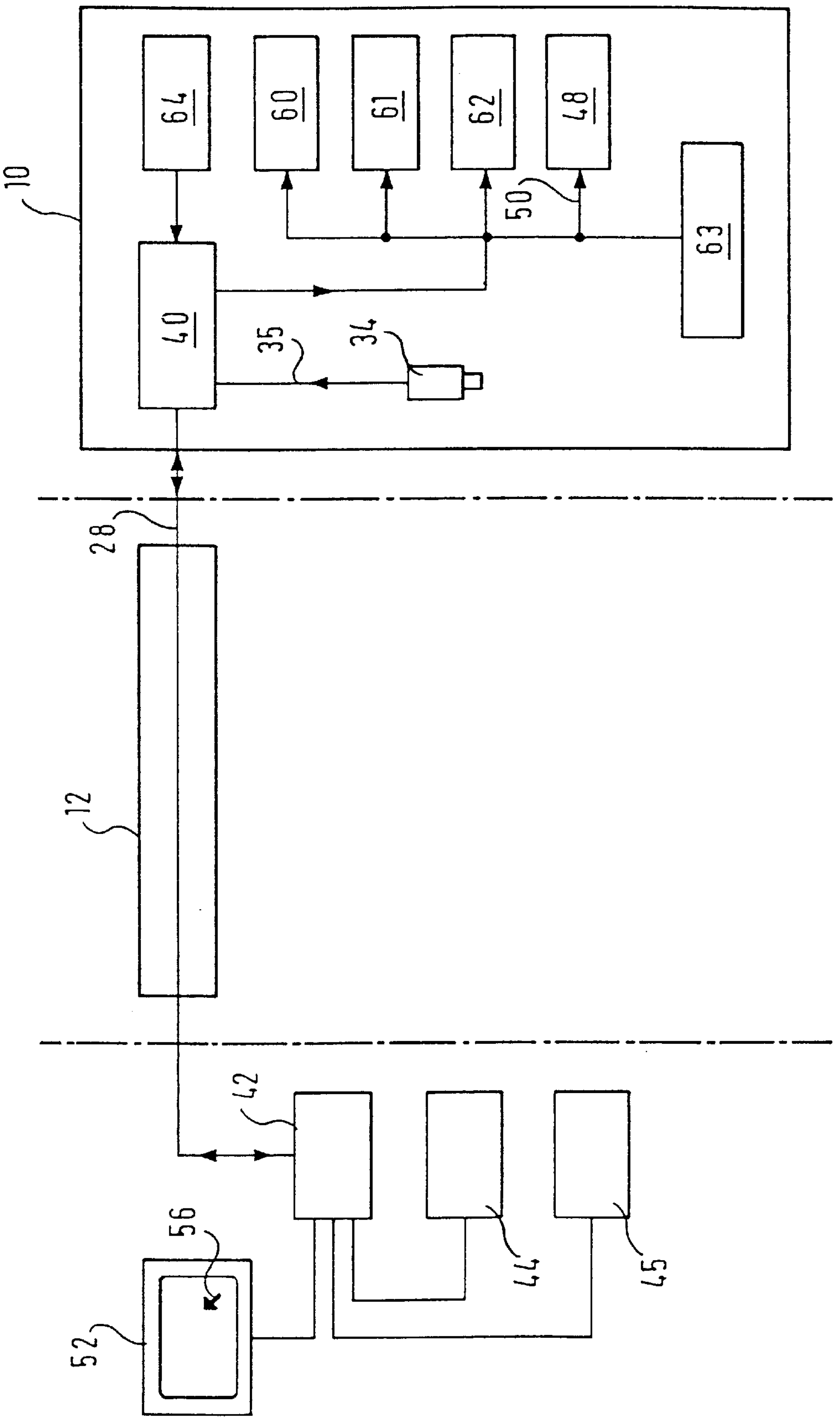
FIG. 2 is a block circuit diagram of a remotely controllable lamp.

FIG. 2 shows a schematic illustration of a remotely controllable lamp which is similar to that illustrated in FIG. 1. In this the lamp body 10 and the suspension 12 are merely represented as blocks in order to better clarify the signal conduction. The left region in FIG. 2 corresponds to the operation room or its environment.

In this embodiment, in addition to the operating unit 44 for the operation of the operating theater lamp, a control device 45 which is separate from it is provided for the control of the miniature camera 34.

Signals are given both from the operating unit 44 as well as from the camera control device 45 to the modulator/demodulator 42, which modulates them onto the carrier signal, which is transmitted over the line 28 to the lamp body 10. The modulator/demodulator 40 is arranged in the lamp body 10 and, on the one hand, modulates the image signals from the miniature camera 34 which are transmitted via the image signal line 35 onto the line 28. On the other hand, various control signals are demodulated and are transmitted to functional units of the lamp body.

A functional unit which enables a movement of the lamp body 10 is designated by 60 in FIG. 2. The numeral 61 designates a light dimmer. A light field focusing is designated by 62. The reference symbol 48 designates a light indicator. The units 48 and 60 to 62 can be directly excited via an operating keyboard 63. Finally, a return message unit is designated by 64, through which data or information respectively can be transmitted from the lamp body to the operating unit 44 or the camera control device 45.

Figure 3:
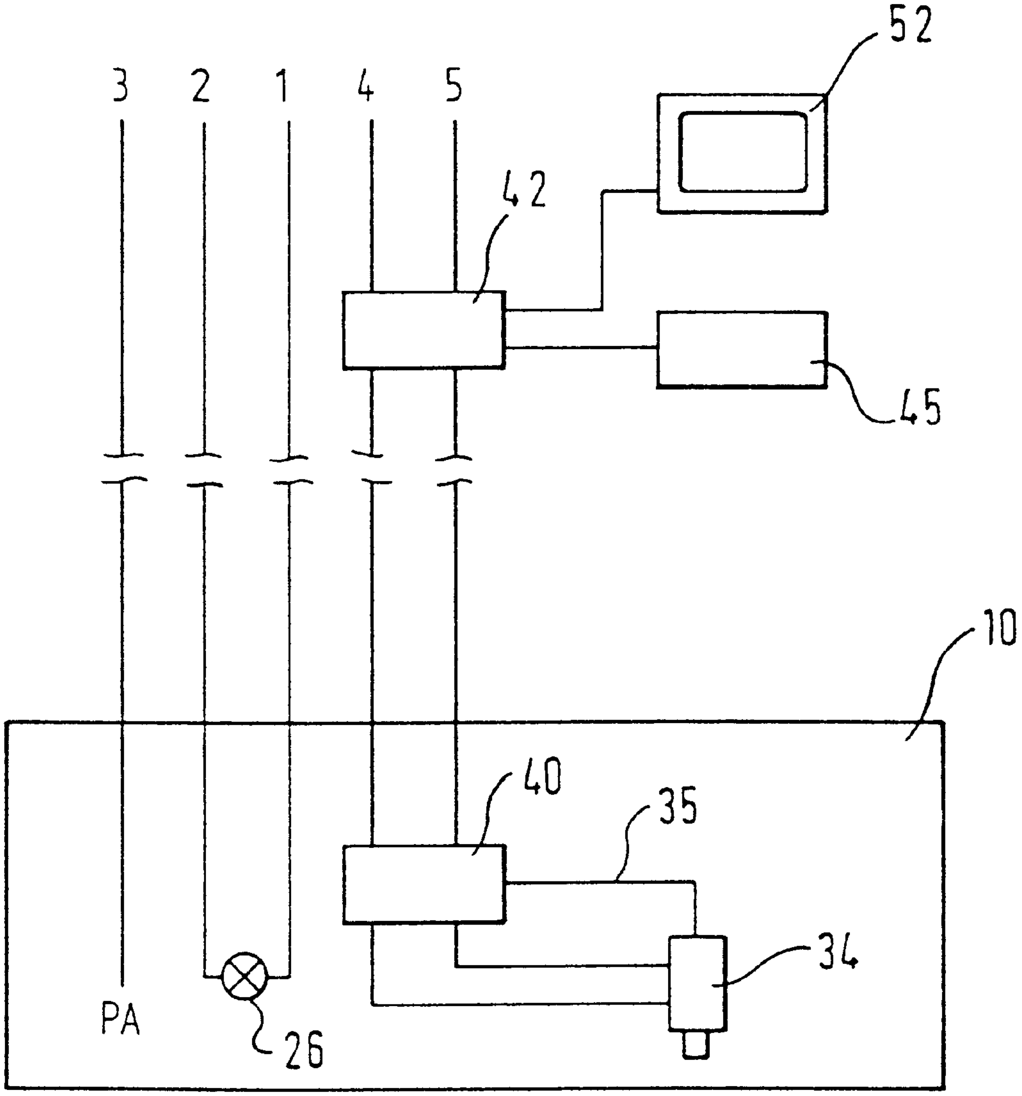
FIG. 3 is a schematic illustration of a possible line conducting.

FIG. 3 shows a further embodiment of a remotely controllable lamp in which the line 28 consists of five leads. The leads 1 and 2 serve for the supplying of the illumination means 26 with power. The numeral 3 designates a potential equalization. In addition to these conventionally present lines, two further leads 4 and 5 are provided which serve for the supplying of the miniature camera 34 with power. With the help of the modulator/demodulator 42 both control signals for the camera 34 from the camera control device 45 are modulated onto the leads 4 and 5. At the same time, the image signal resulting from the camera 34 is demodulated and reproduced on the monitor 52. Inside the lamp body the modulation/demodulation takes place through the modulator/demodulator 40.

In this embodiment the signals required for the image transmission and for the camera control (focusing, black/white adjustment) are completely separate from the supplying of the illumination means 26 with power so that here no interference signals are transmitted, which could for example arise through the dimming of the illumination means 26. Alternatively to the embodiment illustrated in FIG. 3, it is also possible to replace one of the leads 4 or 5 by the potential equalization 3. In this case merely four leads are required.

In the embodiment illustrated in FIG. 3 those control signals which are less sensitive to interference signals, in particular the control of the drives in the joints, can be transmitted via the leads 1 and 2 to the lamp body 10. In this case two further modulators/demodulators are required.

What is claimed is:

1. An operating theater lamp comprising a lamp body including a grip; a miniature camera attached to the grip; a suspension supporting the lamp body and having a plurality of joints each including a drive device for manipulating the lamp body; first and second modulator/demodulator units connected via an electric line, the first modulator/demodulator unit being attached to the lamp body; an operating unit connected to the second modulator/demodulator unit and generating control signals for independently controlling operation of the miniature camera and at least one of lamp body manipulation movements and a portion of the suspension; and means for supplying a carrier signal and modulating the control signals with one of the first and second modulator/demodulator units onto the carrier signal and demodulating the modulated control signals with the other one of the first and second modulator/demodulator units.

2. Operating theater lamp in accordance with claim 1, comprising a remote controlled laser pointer at the lamp body and a drive element for moving the laser pointer.

3. Operating theater lamp in accordance with claim 2, comprising one of a sensor pad, a joystick and a keyboard for controlling movements of the laser pointer.

4. Operating theater lamp in accordance with claim 1 comprising modulating/demodulating means for modulating one or more of a speech signal and an image signal onto the carrier signal.

5. Operating theater lamp in accordance with claim 1 including a power supply line of the operating theater lamp, and wherein the carrier signal is transmitted through the power supply line.

6. Operating theater lamp in accordance with claim 1, comprising a power supply of the operating theater lamp and a separate line for conducting the carrier signal.

7. Operating theater lamp in accordance with claim 1, comprising a line for conducting the carrier signal, one lead of which comprises a ground potential line.

8. Operating theater lamp in accordance with claim 1, comprising first and second separate lines for respectively a first carrier signal carrying control signals for and/or image signals of the miniature camera, and a second carrier signal carrying control signals for the manipulation movements of the lamp body.

9. Operating theater lamp in accordance with claim 1, comprising illumination means attached to the lamp body for generating a variable size light field, and a drive for moving the illumination means.

10. Operating theater lamp in accordance with claim 1, wherein the miniature camera generates a video output image, and further comprising a remote controlled indicator which,can be varied with the operating unit and is represented as a marker within the video output image of the miniature camera.

11. Operating theater lamp in accordance with claim 1, including a microphone attached to the operating theater lamp and connected with the modulator/demodulator units.

12. Operating theater lamp in accordance with claim 1, comprising a light source attached to the operating theater lamp and means for remotely controlling a brightness of light generated by the light source.

13. Operating theater lamp in accordance with claim 1, comprising transmission means allowing a bi-directional signal transmission of the control signals.

14. Operating theater lamp in accordance with claim 1, comprising coding means for digitally coding the control signals.

* * * * *